(12) United States Patent
Ashjaee

(10) Patent No.: US 10,514,467 B2
(45) Date of Patent: Dec. 24, 2019

(54) UP SAMPLING REFERENCE STATION DATA

(71) Applicant: JAVAD GNSS, Inc., San Jose, CA (US)

(72) Inventor: Javad Ashjaee, Saratoga, CA (US)

(73) Assignee: JAVAD GNSS, INC., San Jose, CA (US)

( * ) Notice: Subject to any disclaimer, the term of this patent is extended or adjusted under 35 U.S.C. 154(b) by 341 days.

(21) Appl. No.: 15/482,625

(22) Filed: Apr. 7, 2017

(65) Prior Publication Data

US 2017/0293032 A1 Oct. 12, 2017

Related U.S. Application Data

(60) Provisional application No. 62/320,312, filed on Apr. 8, 2016.

(51) Int. Cl.
 *G01S 19/43* (2010.01)
(52) U.S. Cl.
 CPC .................................. *G01S 19/43* (2013.01)
(58) Field of Classification Search
 CPC ........ G01S 19/43; G01S 19/41; G01S 5/0036; G01S 5/0027
 USPC .................................................... 342/357.46
 See application file for complete search history.

(56) References Cited

U.S. PATENT DOCUMENTS

| | | | |
|---|---|---|---|
| 8,022,868 B2 | 9/2011 | Yudanov et al. | |
| 8,094,087 B2 | 1/2012 | Ashjaee et al. | |
| 8,120,527 B2 | 2/2012 | Ashjaee et al. | |
| 8,125,376 B1 | 2/2012 | Ashjaee et al. | |
| 8,169,379 B2 | 5/2012 | Zhukov et al. | |
| 8,224,525 B1 | 7/2012 | Rapoport et al. | |
| 8,606,498 B2 | 12/2013 | Pesterev et al. | |
| 8,629,988 B2 | 1/2014 | Gribkov | |
| 8,717,232 B2 | 5/2014 | Ashjaee et al. | |
| 8,717,233 B2 | 5/2014 | Ashjaee et al. | |
| 8,872,700 B2 | 10/2014 | Ashjaee et al. | |
| 8,975,967 B2 | 3/2015 | Ashjaee et al. | |
| 9,103,912 B2 | 8/2015 | Yudanov et al. | |
| 9,168,946 B2 | 10/2015 | Ashjaee et al. | |
| 9,228,835 B2 | 1/2016 | Gribkov et al. | |
| 9,250,328 B2 | 2/2016 | Ashjaee et al. | |
| 9,671,497 B2 | 6/2017 | Ashjaee et al. | |
| 9,720,093 B2 | 8/2017 | Ashjaee et al. | |
| 9,748,926 B2 | 8/2017 | Ashjaee et al. | |

(Continued)

OTHER PUBLICATIONS

Unpublished U.S. Appl. No. 15/673,124, titled "Clustering GNSS Data", filed Aug. 9, 2017.

*Primary Examiner* — Harry K Liu
(74) *Attorney, Agent, or Firm* — Morrison & Foerster LLP (57) ABSTRACT

A method of determining a position of a GNSS device includes receiving GNSS signals at the GNSS device from a plurality of GNSS satellites. The GNSS device generates GNSS raw data based on the GNSS signals. The GNSS raw data is stored on the GNSS device. The GNSS device receives first correction data and second correction data. The first correction data and the second correction data are generated from data from at least one reference station. Third correction data is determined based on the first correction data, the second correction data, and the GNSS raw data. Position data for the GNSS device is determined based on the third correction data and the GNSS raw data.

17 Claims, 9 Drawing Sheets

(56) References Cited

U.S. PATENT DOCUMENTS

| | | |
|---|---|---|
| 2012/0229333 A1 | 9/2012 | Ashjaee et al. |
| 2012/0286991 A1* | 11/2012 | Chen ................... G01S 19/04 |
| | | 342/357.23 |
| 2012/0299936 A1 | 11/2012 | Ashjaee et al. |
| 2013/0016006 A1 | 1/2013 | Ashjaee et al. |
| 2014/0062778 A1 | 3/2014 | Ashjaee et al. |
| 2015/0100269 A1 | 4/2015 | Ashjaee |
| 2015/0116145 A1 | 4/2015 | Ashjaee |
| 2015/0234055 A1 | 8/2015 | Ashjaee et al. |
| 2016/0018530 A1 | 1/2016 | Ashjaee |
| 2016/0036519 A1* | 2/2016 | Loomis ................... H04B 7/22 |
| | | 370/316 |
| 2016/0041268 A1 | 2/2016 | Ashjaee |
| 2016/0178368 A1 | 6/2016 | Ashjaee |
| 2016/0178369 A1 | 6/2016 | Ashjaee |
| 2016/0178754 A1 | 6/2016 | Ashjaee |
| 2017/0219715 A1 | 8/2017 | Ashjaee |
| 2017/0343678 A1 | 11/2017 | Ashjaee |

* cited by examiner

UP SAMPLING REFERENCE STATION DATA

CROSS-REFERENCE TO RELATED APPLICATIONS

This application claims the benefit of U.S. Provisional Application No. 62/320,312, filed on Apr. 8, 2016, entitled "UP SAMPLING REFERENCE STATION DATA," the entire contents of which are incorporated herein by reference.

BACKGROUND

1. Field

The present disclosure relates generally to geodesy and precise positioning of a handheld geodesic device.

2. Related Art

Navigation receivers that use global navigation satellite systems, such as GPS or GLONASS (hereinafter collectively referred to as "GNSS"), enable a highly accurate determination of the position of the receiver. The satellite signals may include carrier harmonic signals that are modulated by pseudo-random binary codes and that, on the receiver side, may be used to measure the delay relative to a local reference clock. These delay measurements may be used to determine the pseudo-ranges between the receiver and the satellites. The pseudo-ranges are not true geometric ranges because the receiver's local clock may be different from the satellite onboard clocks. If the number of satellites in sight is greater than or equal to four, then the measured pseudo-ranges can be processed to determine the user's single point location as represented by a vector $X=(x, y, z)^T$, as well as to compensate for the receiver clock offset.

GNSS finds particular application in the field of surveying, which requires highly accurate measurements. The need to improve positioning accuracies has eventually led to the development of differential navigation/positioning. In this mode, the user position is determined relative to an antenna connected to a base receiver or a network of base receivers with the assumption that the positional coordinates of the base receiver(s) are known with high accuracy. The base receiver or receiver network transmits its measurements (or corrections to the full measurements) to a mobile navigation receiver (or rover). The rover receiver uses these corrections to refine its measurements in the course of data processing. The rationale for this approach is that since the pseudo-range measurement errors on the base and rover sides are strongly correlated, using differential measurements will substantially improve positioning accuracy.

Typically, the base is static and located at a known position. However, in relative navigation mode, both the base and rover are moving. In this mode, the user is interested in determining the vector between the base and the rover. In other words, the user is interested in determining the continuously changing rover position relative to the continuously changing position of the base. For example, when one aircraft or space vehicle is approaching another for in-flight refueling or docking, a highly accurate determination of relative position is important, while the absolute position of each vehicle is generally not critical.

The position of the rover changes continuously in time, and thus should be referenced to a time scale. The determination of the position of a mobile rover with respect to a base receiver in real-time may be performed using an RTK algorithm, which may be stored in memory on the rover. As the name "real-time kinematic" implies, the rover receiver is capable of calculating/outputting its precise position as the raw data measurements and differential corrections become available at the rover. When implementing an RTK algorithm, a data communication link (e.g., a radio communication link, a GSM binary data communication link, etc.) may be used to transmit the necessary information from the base to the rover.

Further improvement of the accuracy in differential navigation/positioning applications can be achieved by using both the carrier phase and pseudo-range measurements from the satellites to which the receivers are locked. For example, by measuring the carrier phase of the signal received from a satellite in the base receiver and comparing it with the carrier phase of the same satellite measured in the rover receiver, one can obtain measurement accuracy to within a small fraction of the carries wavelength.

One well-known type of measurement error that can reduce the accuracy of differential navigation/positioning is multipath error. Multipath errors are caused by the reflection of the GNSS satellite signals by surfaces located near the receiving antenna. As a result of these reflections, the antenna receives both the direct signal traveling the shortest path from the satellite to the receiver as well as the reflected signals following indirect paths. The combination of two (or more) signals at the antenna leads to the distortion of raw measurements. Multipath errors may affect both pseudo-range and carrier phase measurements.

SUMMARY

In an embodiment for determining positions for a set of points using a GNSS rover unit, a correction signal is received from a GNSS base unit. The GNSS base unit is located at a fixed point. The correction signal is used to determine a position of a point of the set of points. The position is stored in memory of the GNSS rover unit as position data. These steps are repeated for each point in the set of points. Raw GNSS data of the GNSS base unit is transmitted to the server system. A corrected position of the GNSS base unit is received from the server system. The position data is translated based on the corrected position of the GNSS base unit to produce adjusted position data.

In the following description, reference is made to the accompanying drawings which form a part thereof, and which illustrate several examples of the present disclosure. It is understood that other examples may be utilized and structural and operational changes may be made without departing from the scope of the present disclosure. The use of the same reference symbols in different drawings indicates similar or identical items.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the technology as claimed. Thus, the various embodiments are not intended to be limited to the examples described herein and shown, but are to be accorded the scope consistent with the claims.

Systems and methods for performing land surveying using RTK engine verification are provided. In one example, a first set of positions of a GNSS receiver may be determined using each of a plurality of RTK engines. If a number of the plurality of RTK engines that produce a fixed solution is greater than or equal to a threshold value, a position of the GNSS receiver may be determined based on at least a portion of the first set of positions. The determined position may then be stored. This process may be repeated any number of times to produce a desired number of stored positions. In response to the number of stored positions being equal to a minimum value, a final position of the GNSS device may be determined based on the stored positions.

Figure 1:
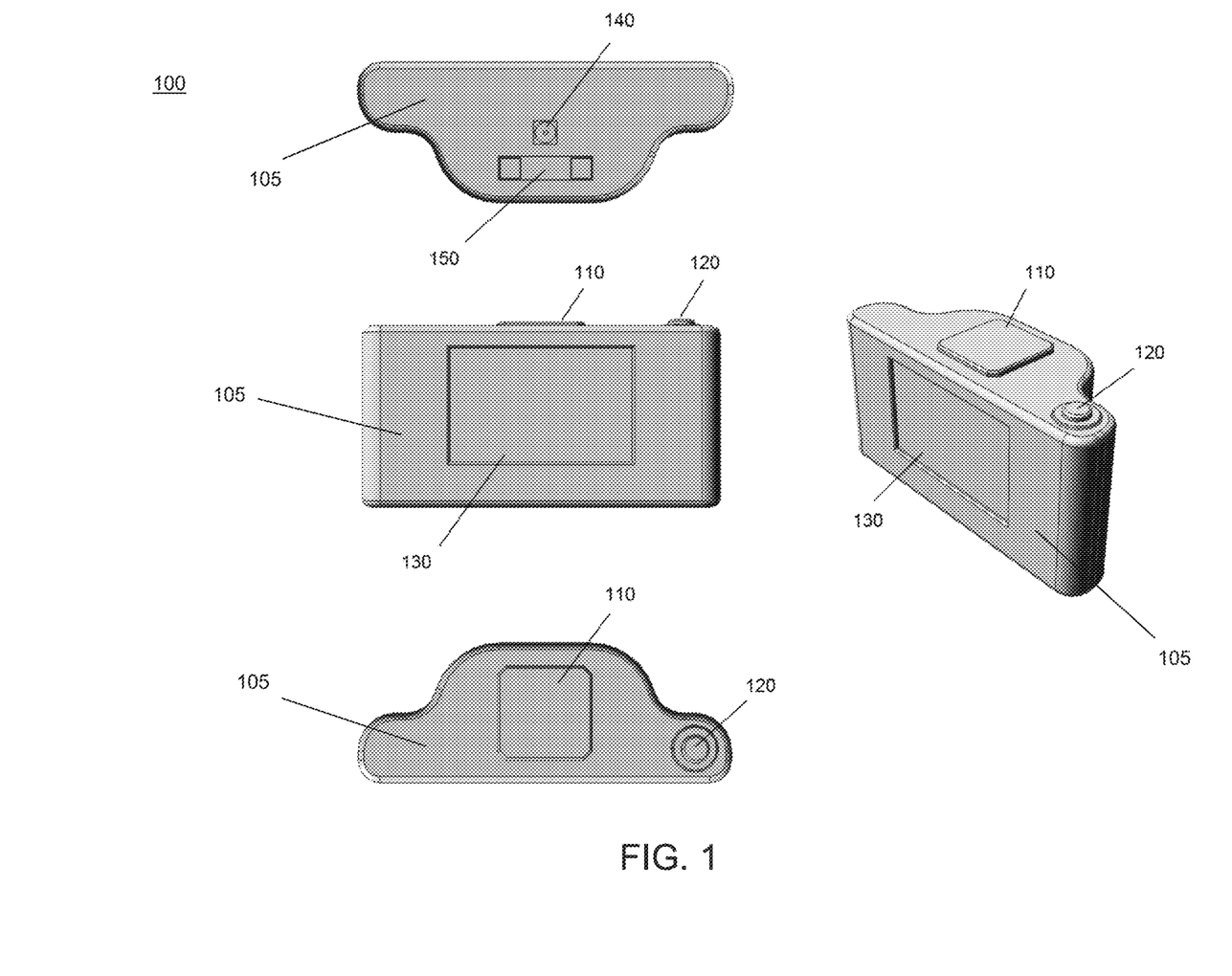
FIG. 1 illustrates an exemplary graphics-aided geodesic device viewed from various angles.

FIG. 1 illustrates an exemplary graphics-aided geodesic device 100 viewed from various angles. Graphics-aided geodesic device 100 is shown contained within camera housing 105. Camera housing 105 allows the user to hold graphics-aided geodesic device 100 as one would hold a typical camera. In one example, the device may include GNSS antenna 110 which may receive signals transmitted by a plurality of GNSS satellites and used by graphics-aided geodesic device 100 to determine position. In one example, GNSS antenna may receive signals transmitted by at least 4 GNSS satellites. In the example shown by FIG. 1, GNSS antenna 110 is located on the top side of graphics-aided geodesic device 100.

Graphics-aided geodesic device 100 may further include a GNSS receiver (not shown) for converting the signal received by GNSS antenna 110 into Earth-based coordinates, for example, World Geodetic System 84 (WGS84), Earth-Centered Earth Fixed (ECEF), local east, north, up coordinates (ENU), and the like. Such receivers are well-known by those of ordinary skill in the art and any such device may be used.

Graphics-aided geodesic device 100 may further include "measure" button 120 to cause the device to perform a position measurement. In one example, this button may be similar to that of a conventional camera. However, instead of taking a photograph, "measure" button 120 may cause graphics-aided geodesic device 100 to perform a position measurement as described in greater detail below. In the example shown by FIG. 1, "measure" button 120 is located on the top side of graphics-aided geodesic device 100.

Graphics-aided geodesic device 100 may further include display 130 for displaying information to assist the user in positioning the device. Display 130 may be any electronic display such as a projection display, a liquid crystal (LCD) display, light emitting diode (LED) display, a plasma display, and the like. Such display devices are well-known by those of ordinary skill in the art and any such device may be used. In the example shown by FIG. 1, display 130 is located on the back side of graphics-aided geodesic device 100.

Graphics-aided geodesic device 100 may further include camera 140 for recording still images or video. Such recording devices are well-known by those of ordinary skill in the art and any such device may be used. In the example illustrated by FIG. 1, camera 140 is located on the bottom side of graphics-aided geodesic device 100. A more detailed description of the positioning of camera 140 will be provided below with respect to FIGS. 2A-C. In one example, display 130 may be used to display the out put of camera 140. Thus, when held upright, display 130 displays a view of the ground located below graphics-aided geodesic device 100.

Graphics-aided geodesic device 100 may further include horizon sensors (not shown) for determining the orientation of the device. The horizon sensors may be any type of horizon sensor, such as an inclinometer, accelerometer, and the like. Such horizon sensors are well-known by those of ordinary skill in the art and any such device may be used. In one example, a representation of the output of the horizon sensors may be displayed using display 130. A more detailed description of display 130 is provided below. Horizon sensors 215 and 216 are illustrated in FIGS. 2A-2C and FIG. 3.

The horizon sensors 215 and 216, by determining the inclination of the geodesic device 100, allow a CPU to compensate for errors resulting from the mis-leveling of the geodesic device 100. A user taking a position measurement may position the geodesic device 100 so that it is not level with respect to a plane parallel to the horizon. However, the CPU 360 (FIG. 3) of the geodesic device 100, receiving orientation data from the horizon sensors 215 and 216, can compensate the position determination as long as the inclination of the geodesic device 100 is below an inclination threshold. In this way, the orientation data, indicating the orientation of the GNSS antenna 110, may be used by the CPU 360 to correct for errors in the position data received by the GNSS antenna 360. (The position determination and compensation by the CPU 360 is generally discussed below). For example, a geodesic device 100 may be configured to have an inclination error of 15 degrees. As such, if the inclination of the geodesic device 100 is between 0 to 15 degrees with respect to a plane parallel to the horizon, the CPU 360 will determine the position of the point of interest.

Furthermore, the horizon sensors 215 and 216 determining the inclination of the geodesic device 100 with respect to a plane parallel with the horizon may be used to determine when the CPU 360 of the geodesic device 100 determines the position of a point of interest. The horizon sensors 215 and 216 measure the inclination of the geodesic device 100 with respect to a plane parallel to the horizon. The CPU 360 automatically begins determining the position of a point of interest when the inclination of the geodesic device 100 enters a predetermined inclination range. The CPU 360 continues determining position of the point of interest as long as the inclination of the geodesic device 100 is within the predetermined inclination range. If the inclination is measured to be outside the predetermined inclination range, the CPU 360 suspends determining the position of the point of interest. For example, the user of the geodesic device 100 may indicate that a position measurement should be taken at an inclination of 0 to 15 degrees from a plane parallel with the horizon. When the user holding the geodesic device 100 positions the geodesic device at 5 degrees, the position measurement by the CPU 360 starts automatically. Similarly, when the user tilts the geodesic device 100 so the inclination is no longer within the range of 0 to 15 degrees, the CPU 360 suspends the position measurement. In other words, the user may set a predetermined inclination range at which the CPU 360 will initiate the position measurement. Thus, by measuring the inclination of the geodesic device 100 during positioning by the user, the position measurement by the CPU 360 starts and stops depending on the positioning and orientation of the geodesic device 100. In this way, the user does not need to activate the position determination by depressing a start and stop key, for example. Moreover, the user does not need to search for a start or stop button to take a position measurement when environmental conditions, such as bright sunlight and darkness, may make it challenging for the user to find specific soft keys or hard buttons, respectively.

Moreover, if the horizon sensors 215 and 216 determines the inclination to be more than a predetermined threshold inclination, the CPU 360 deactivates buttons and touch display screen so that they do not respond to user actuation input or inadvertently activated. The CPU 360 deactivates, or locks, the function of buttons and the touch screen when the horizon sensors 215 and 216 determine the geodesic device 100 is inclined more than a predetermined threshold inclination. In one example, the buttons and display screen of the geodesic device 100 locks when the horizon sensors 215 and 216 determines the inclination of the geodesic device 100 is more than 30 degrees.

Graphics-aided geodesic device 100 may further include distance sensor 150 to measure a linear distance. Distance sensor 150 may use any range-finding technology, such as sonar, laser, radar, and the like. Such distance sensors are well-known by those of ordinary skill in the art and any such device may be used. In the example illustrated by FIG. 1, distance sensor 150 is located on the bottom side of graphics-aided geodesic device 100.

Figure 2A:
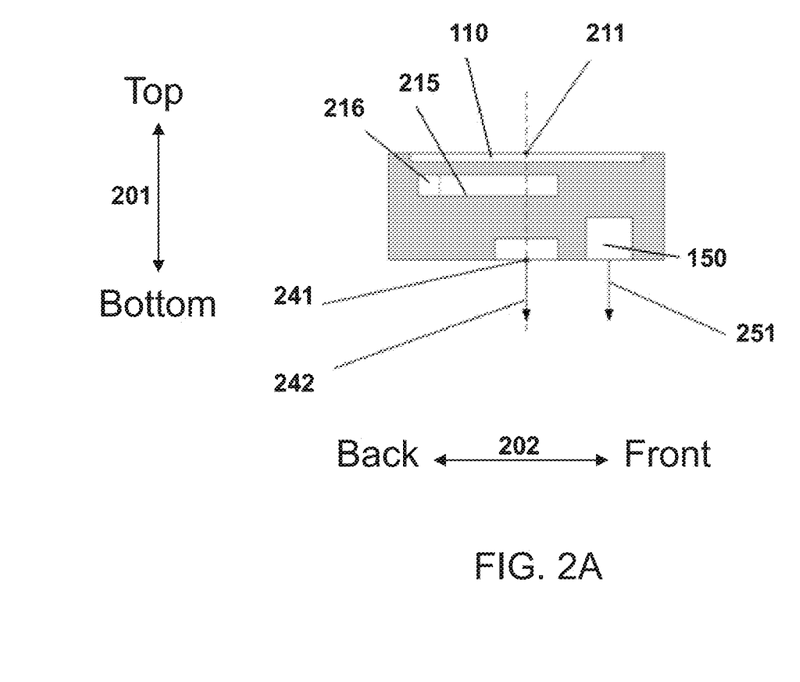
FIG. 2A illustrates an exemplary view of the orientation of the components of a graphics-aided geodesic device.
Figure 2B:
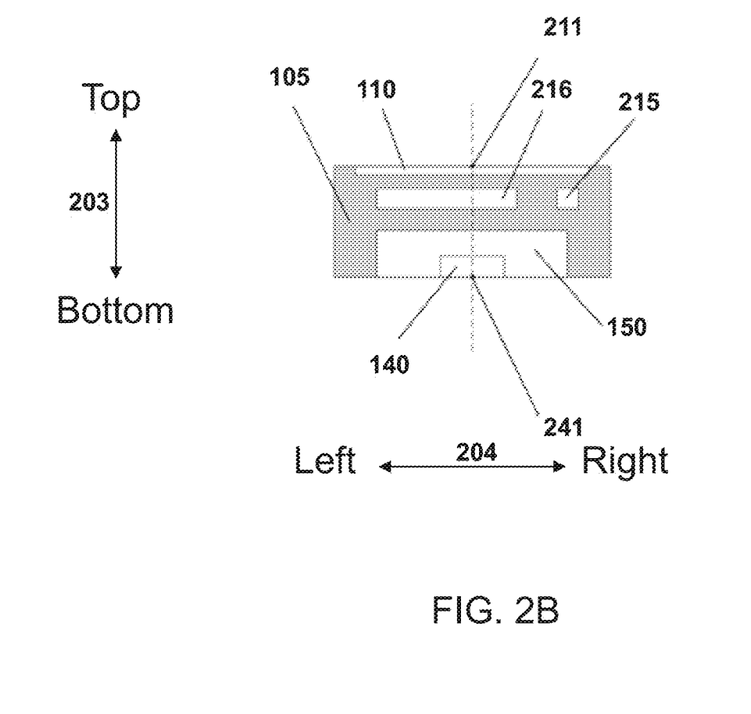
FIG. 2B illustrates another exemplary view of the orientation of the components of a graphics-aided geodesic device.
Figure 2C:
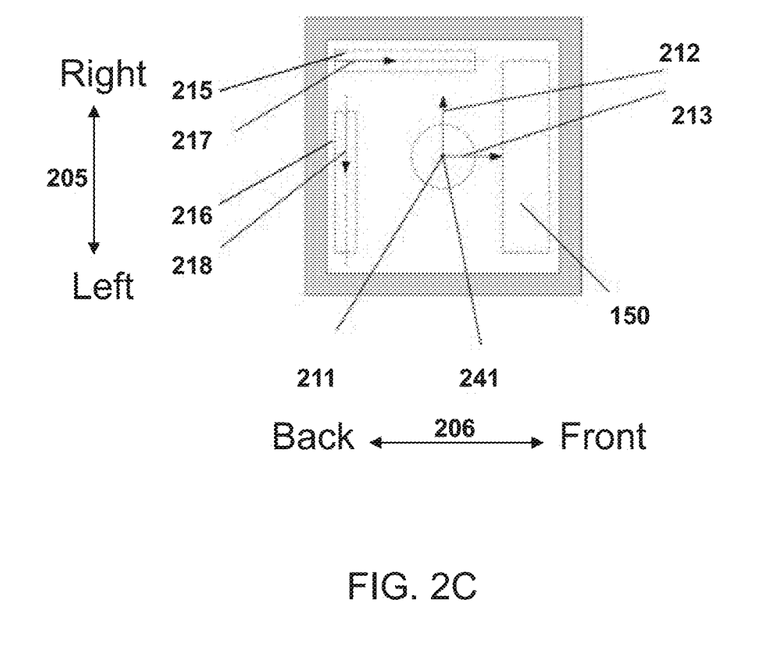
FIG. 2C illustrates yet another exemplary view of the orientation of the components of a graphics-aided geodesic device.

FIGS. 2A-C illustrate exemplary views of graphics-aided geodesic device 100 and the orientation of its components from various angles. FIG. 2A shows a side view of graphics-aided geodesic device 100 with arrows 201 and 202 indicating the top/bottom and front/back of the device, respectively. FIG. 2B shows graphics-aided geodesic device 100 viewed from the back with arrows 203 and 204 indicating the top/bottom and left/right side of the device, respectively. FIG. 2C shows a bottom view of graphics-aided geodesic device 100 with arrows 205 and 206 indicating the right/left side and front/back of the device, respectively.

In the examples illustrated by FIGS. 2A-C, camera housing 105 contains antenna 110, horizon sensors 215 and 216, distance sensor 150, and camera 140. The orientation of the components will be described herein with the use of vectors which indicate a direction in space. For instance, antenna 110 has an antenna ground plane defined by antenna phase center 211 and two ground plane vectors 212 and 213. In one example, ground plane vectors 212 and 213 are parallel or substantially parallel to the local horizon. Camera 140 has optical center 241 located along camera optical axis 242. Camera optical axis 242 passes through antenna phase center 211 and is orthogonal or substantially orthogonal to ground plane vectors 212 and 213. Distance sensor 150 has distance sensor main axis (measuring direction) 251 which is parallel or substantially parallel to camera optical axis 242. Horizon sensors 215 and 216 have orthogonal or substantially orthogonal measurement vectors 217 and 218 which create a plane parallel or substantially parallel to the antenna ground plane defined by ground plane vectors 212 and 213. It should be appreciated that in a real-world application, the components of graphics-aided geodesic device 100 may not be positioned exactly as described above. For instance, due to manufacturing imperfections, the orientations of certain components may not be parallel or orthogonal to the other components as designed. The tolerances for the orientations of the various components depend on the desired precision of the resulting position measurement.

Figure 3:
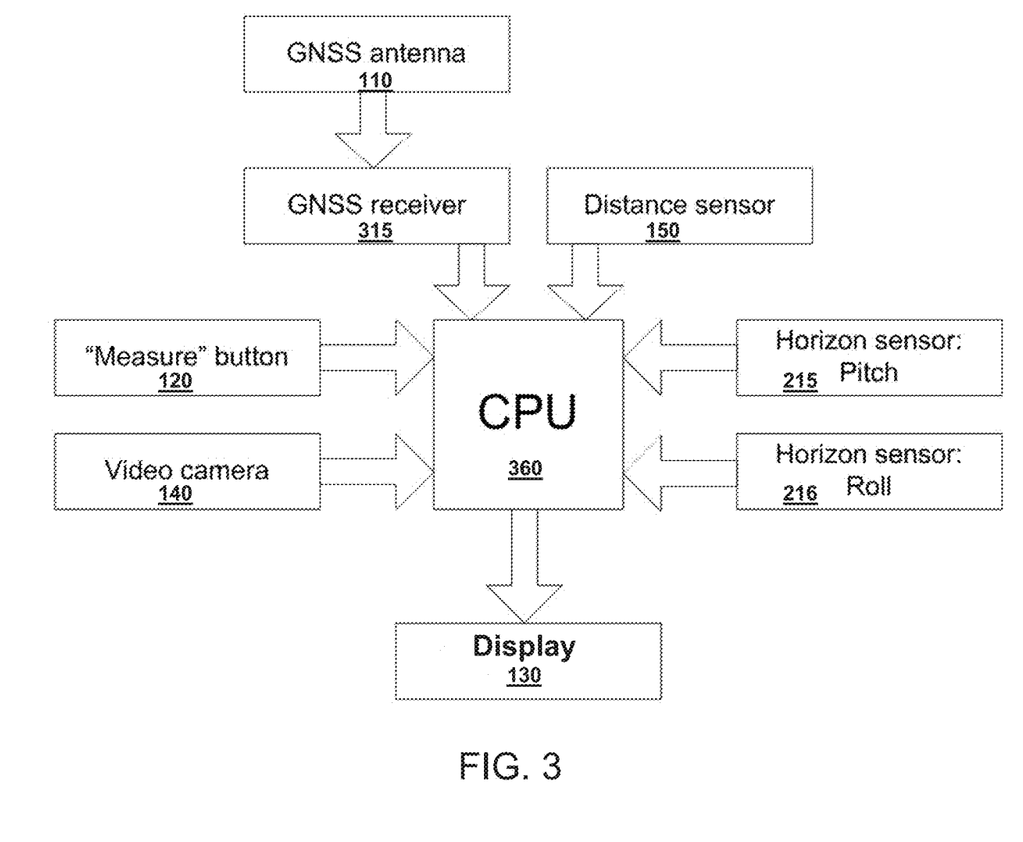
FIG. 3 illustrates an exemplary logic diagram showing the relationships between the various components of a graphics-aided geodesic device.

FIG. 3 illustrates an exemplary logic diagram showing the relationships between the various components of graphics-aided geodesic device 100. In one example, GNSS antenna 110 may send position data received from GNSS satellites to GNSS receiver 315. GNSS receiver 315 may convert the received GNSS satellite signals into Earth-based coordinates, such as WGS84, ECEF, ENU, and the like. GNSS receiver 315 may further send the coordinates to CPU 360 for processing along with distance data from distance sensor 150, pitch data from pitch horizon sensor 215, roll data from roll horizon sensor 216, a measure command from "measure" button 120, and image data from video camera 140. CPU 360 processes the data as will be described in greater detail below and provides display data to be displayed on display 130. The GNSS receiver may also include one or more communication interfaces (not shown) as discussed in detail below. These communication interfaces may be used to transmit and receive position data, correction signals, and other data.

Figure 4:
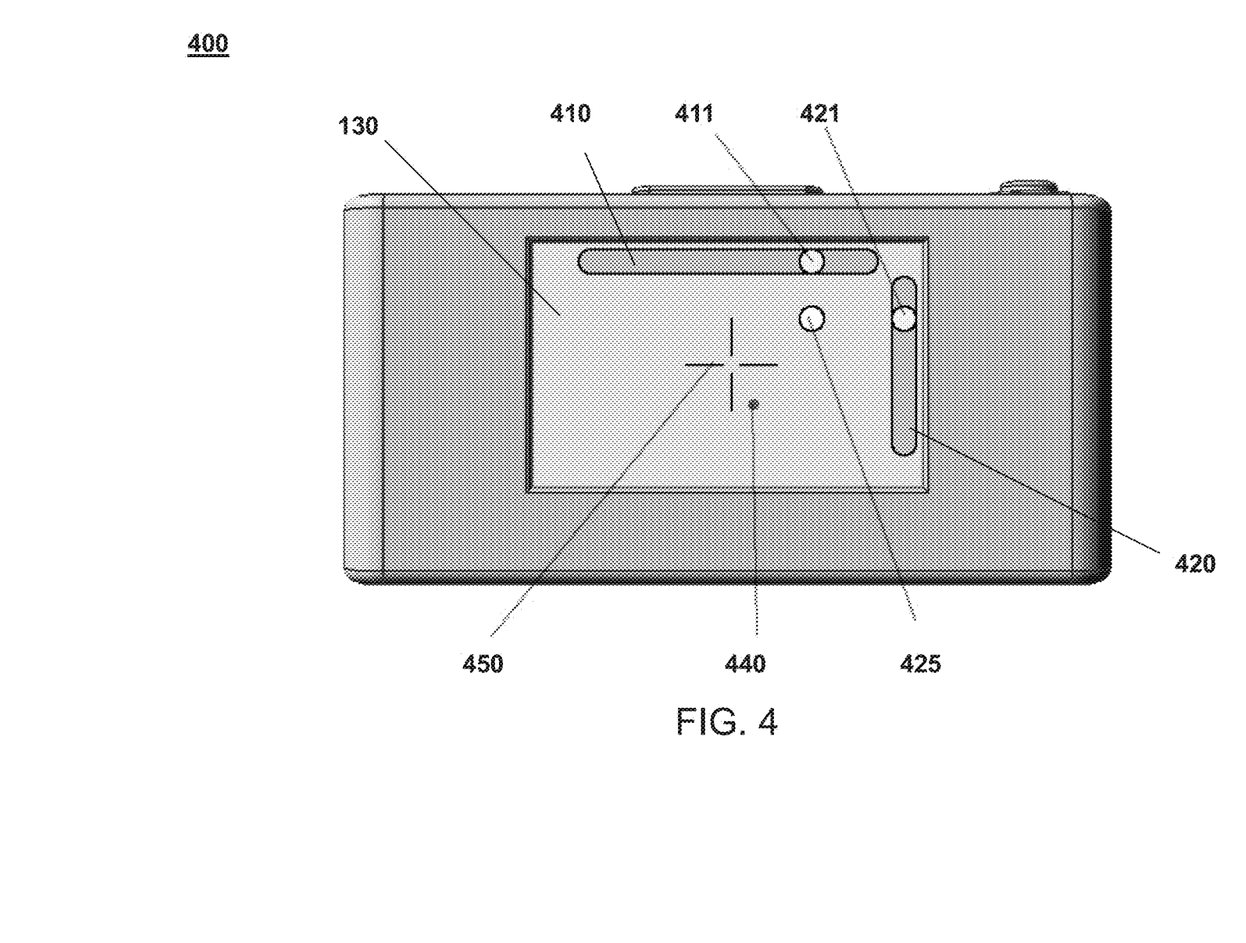
FIG. 4 illustrates an exemplary view of the display screen of a graphics-aided geodesic device including elements used for positioning the device.

FIG. 4 illustrates an exemplary view 400 of display 130 for positioning graphics-aided geodesic device 100. In one example, display 130 may display the output of camera 140. In this example, the display of the output of camera 140 includes point of interest marker 440. As shown in FIG. 4, point of interest marker 440 is a small circular object identifying a particular location on the ground. In the examples provided herein, we assume that the location to be measured is located on the ground and that the point of interest is identifiable by a visible marker (e.g., point of interest marker 440). The marker may be any object having a small height value. For instance, an "X" painted on ground or a circular piece of colored paper placed on the point of interest may serve as point of interest marker 440.

In another example, display 130 may further include virtual linear bubble levels 410 and 420 corresponding to the roll and pitch of graphics-aided geodesic device 100, respectively. Virtual linear bubble levels 410 and 420 may include virtual bubbles 411 and 421 which identify the amount and direction of roll and pitch of graphics-aided geodesic device 100. Virtual linear bubble levels 410 and 420 and virtual bubbles 411 and 421 may be generated by CPU 360 and overlaid on the actual image output of camera 140. In one example, positioning of virtual bubbles 411 and 421 in the middle of virtual linear bubble levels 410 and 420 indicate that the device is positioned "horizontally." As used herein, "horizontally" refers to the orientation whereby the antenna ground plane is parallel to the local horizon.

In one example, data from horizon sensors 215 and 216 may be used to generate the linear bubble levels 410 and 420. For instance, sensor data from horizon sensors 215 and 216 may be sent to CPU 360 which may convert a scaled sensor measurement into a bubble coordinate within virtual linear bubble levels 410 and 420. CPU 360 may then cause the display on display 130 of virtual bubbles 411 and 421 appropriately placed within virtual linear bubble levels 410 and 420. Thus, virtual linear bubble levels 410 and 420 may act like traditional bubble levels, with virtual bubbles 411 and 421 moving in response to tilting and rolling of graphics-aided geodesic device 400. For example, if graphics-aided geodesic device 100 is tilted forward, bubble 420 may move downwards within virtual linear bubble level 420. Additionally, if graphics-aided geodesic device 100 is rolled to the left, virtual bubble 411 may move to the right within virtual linear bubble level 410. However, since virtual linear bubble levels 410 and 420 are generated by CPU 360, movement of virtual bubbles 411 and 421 may be programmed to move in any direction in response to movement of graphics-aided geodesic device 100.

In another example, display 130 may further include planar bubble level 425. Planar bubble level 425 represents a combination of virtual linear bubble levels 410 and 420 (e.g., placed at the intersection of the bubbles within the linear levels) and may be generated by combining measurements of two orthogonal horizon sensors (e.g., horizon sensors 215 and 216). For instance, scaled measurements of horizon sensors 215 and 216 may be converted by CPU 360 into X and Y coordinates on display 130. In one example, measurements from horizon sensor 215 may be used to generate the X coordinate and measurements from horizon sensor 216 may be used to generate the Y coordinate of planar bubble level 425.

As shown in FIG. 4, display 130 may further include central crosshair 450. In one example, central crosshair 450 may be placed in the center of display 130. In another example, the location of central crosshair 450 may represent the point in display 130 corresponding to the view of camera 140 along optical axis 242. In yet another example, placement of planar bubble level 425 within central crosshair 450 may correspond to graphics-aided geodesic device 100 being positioned horizontally. Central crosshair 450 may be drawn on the screen of display 130 or may be electronically displayed to display 130.

Display 130 may be used to aid the user in positioning graphics-aided geodesic device 100 over a point of interest by providing feedback regarding the placement and orientation of the device. For instance, the camera output portion of display 130 provides information to the user regarding the placement of graphics-aided geodesic device 100 with respect to objects on the ground. Additionally, virtual linear bubble levels 410 and 420 provide information to the user regarding the orientation of graphics-aided geodesic device 100 with respect to the horizon. Using at least one of the two types of output displayed on display 130, the user may properly position graphics-aided geodesic device 100 without the use of external positioning equipment.

In the example illustrated by FIG. 4, both point of interest marker 440 and planar bubble level 425 are shown as off-center from central crosshair 450. This indicates that optical axis 242 of camera 140 is not pointed directly at the point of interest and that the device is not positioned horizontally. If the user wishes to position the device horizontally above a particular point on the ground, the user must center both planar bubble level 425 and point of interest marker 440 within central crosshair 450 as shown in FIG. 5.

Figure 5:
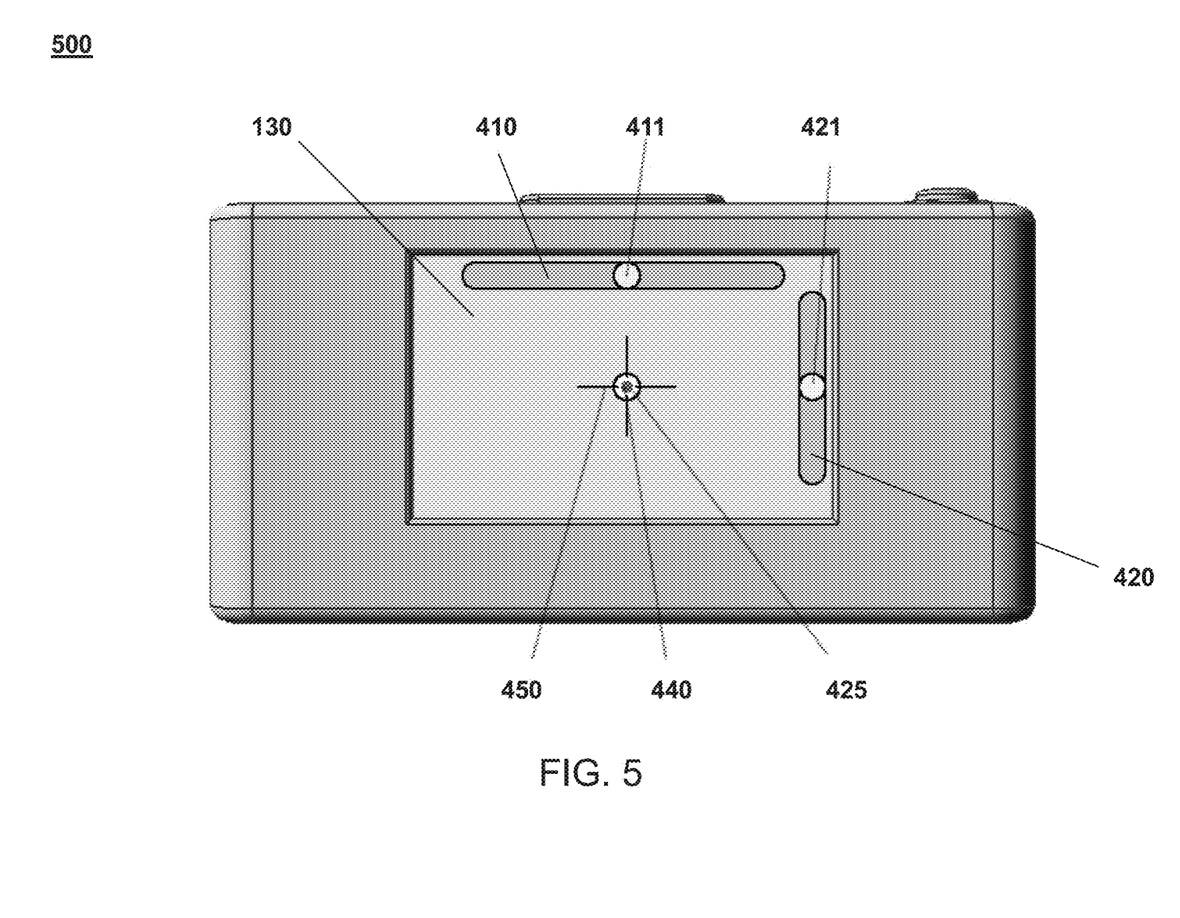
FIG. 5 illustrates another exemplary view of the display screen of a graphics-aided geodesic device oriented horizontally and above a point of interest.

FIG. 5 illustrates another exemplary view 500 of display 130. In this example, virtual linear bubble levels 410 and 420 are shown with their respective bubbles centered, indicating that the device is horizontal. As such, planar bubble level 425 is also centered within central crosshair 450. Additionally, in this example, point of interest marker 440 is shown as centered within central crosshair 450. This indicates that optical axis 242 of camera 140 is pointing towards point of interest marker 440. Thus, in the example shown by FIG. 5, graphics-aided geodesic device 100 is positioned horizontally above point of interest marker 440.

As discussed above with respect to FIG. 2, antenna phase center 211 may be located along optical axis 242. This means that in the example shown by FIG. 5, antenna phase center 211 is also located directly above point of interest marker 440. Thus, the only difference between the position of antenna phase center 211 and point of interest marker 440 is a vertical component equal to the vertical distance between point of interest marker 440 and antenna phase center 211. In this example, the position of point of interest marker 440 may be calculated using the following equation:

$$\vec{P}_x = \vec{P}_{dev} - \vec{n}(D_{in} + D_{out}) \qquad (1)$$

Where:

$\vec{P}_x$—Calculated position of the point of interest.

$\vec{P}_{dev}$—Measured GNSS position of the device antenna phase center.

$\vec{n}$—Unit vector orthogonal to the ground.

$D_{in}$—Vertical distance between antenna phase center 211 and the zero measurement point of distance sensor 150.

$D_{out}$—Distance measured by distance sensor 150 from the sensor's zero measurement point to an object along distance sensor main axis 251.

As shown above, $\vec{P}_x$ of equation (1) represents the calculated position of the point of interest. $\vec{P}_{dev}$ represents the position of antenna phase center 211 determined by graphics-aided geodesic device 100. $\vec{n}$ represents a unit vector pointing in a direction orthogonal to the ground. $D_{in}$ represents the vertical distance between antenna phase center 211 and the zero measurement point of distance sensor 150. The zero measurement point of distance sensor 150 is the point in space for which distance sensor 150 is configured to return a zero value and may be located either inside or outside of graphics-aided geodesic device 100. Thus, $D_{in}$ is a constant value that is specific to each graphics-aided geodesic device 100. Finally, $D_{out}$ represents the distance measured by distance sensor 150 from the sensor's zero measurement point to an object along distance sensor main axis 251. Therefore, $\vec{P}_x$ is calculated by taking the position measured by graphics-aided geodesic device 100 and subtracting a vertical distance equal to the distance measured by distance sensor 150 plus the distance between antenna phase center 211 and the zero measurement point of distance sensor 150.

It should be appreciated that the coordinates used in equation (1) may be expressed in any coordinate system. For example, the above described equation may be applicable to any Cartesian coordinate system and the measurement results may be converted to any Earth-based coordinates, such as WGS84, ECEF, ENU, and the like. Such conversion methods are well-known by those of ordinary skill in the art.

A more detailed description of determining a position based on signals from GNSS satellites and base stations is available in U.S. patent application Ser. No. 12/070,333, filed Feb. 15, 2008, published as U.S. Patent Publication No. 2008/0208454 and Ser. No. 12/360,808, filed Jan. 27, 2009, published as U.S. Patent Publication No. 2009/0189804 assigned to the assignee of the present invention, and each of which are incorporated herein by reference in their entirety for all purposes.

RTK productivity typically improves when the base station is close to the rover. Searching for "integer ambiguity" and having a correct "fixed solution" may become more reliable, faster, and accurate. These improvements may be greater in areas with foliage, multipath, and obstructed satellites. RTN and VRS systems provide a "virtual" base station near you, but this does not mean that the "virtual" base station is a "real" base station that eliminates the integer ambiguity problem. The difficulties of obtaining a fixed solution is still related to the nearest actual base station to your location. There are two problems with depending on your own base station near your rover working area. The following are explanations of both and solutions:

First is the financial investment in an additional receiver. In fact, having a separate base station can be less costly, because it eliminates the need to pay for RTN services and communication costs. Another financial benefit is that productivity increases and more points per hour can be gathered: get a fixed solution and collect a point in seconds rather than minutes, particularly in difficult areas. Also, it eliminates the need to re-observe a point.

Second, the user may not have a known point to set the base station on, or lack confidence in the coordinates of the point. Using a verified base (VB) addresses this problem. The embodiments of the invention may implement a VB reliably and automatically. The results of using a VB RTK system may outperform RTN/VRS systems because in those system the nearest actual "real" base station is often many miles away, while a user can set up a base station near the RTK work area, usually less than a mile away.

In a VB RTK system, a GNSS base unit records raw GNSS data at the base station and transmits corrections to a GNSS rover, such as graphics-aided geodesic device 100. Once position data for a set of points is collected, the user returns to the GNSS base unit and retrieves the raw GNSS data from the GNSS base unit. The raw GNSS data can then be processed against correction data (e.g., NGS CORS data) to produce a corrected position of the GNSS base unit. The position data from the GNSS rover unit is then adjusted according to the corrected position of the GNSS base unit.

A VB RTK system is useful even in situations in which the base was setup on a known point as the corrected position for the GNSS base unit can be compared against the known point coordinates to verify the GNSS base unit position (e.g., setup on the right point, the point had not been damaged, the coordinates were properly entered, the instrument height was correct, etc.).

In cases where a base station is not used, the raw GNSS data can be processed in real-time or post processed based on correction data from a virtual reference station or reference station network that stores correction information for GNSS signals. The correction data, however, may not be updated or recorded at a rate matches the rate at which the GNSS rover unit is producing raw GNSS data for a given position of the GNSS rover unit. For example, the GNSS rover unit may determine the position of the GNSS rover unit once a second. In some cases, a near-by reference station may only provide correction data at a rate of once every 30 seconds. In this case, 29 position measurements may have to be discarded or incorrect correction data may need to be used for the 29 positions measurements that do not line up with the timing of the correction data. Embodiments of the present invention address this issue of discarding position measurements or using outdated correction data.

Figure 6:
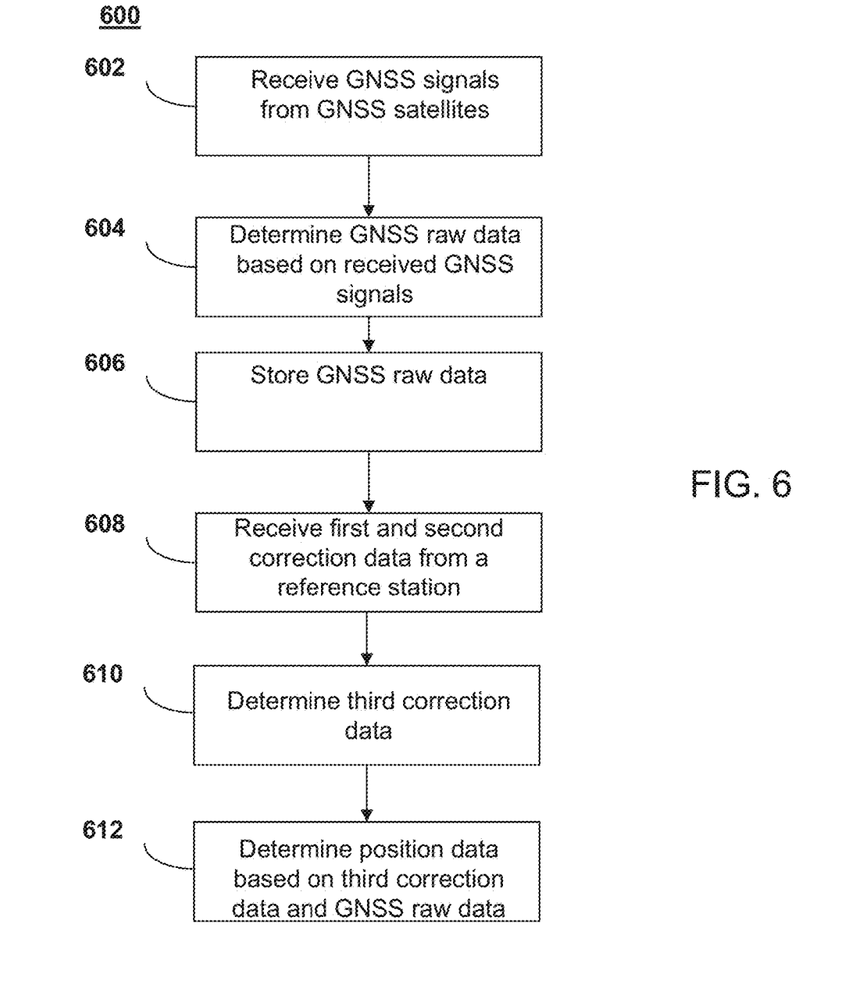
FIG. 6 illustrates an exemplary process for adjusting position data for a set of position.

FIG. 6 illustrates an exemplary process 600 for using a correction data to improve the accuracy of a determined position of a GNSS device. Process 600 relies on a GNSS rover unit (e.g., graphics-aided geodesic device 100).

At block 602, a GNSS rover unit (e.g., the device described with respect to FIGS. 1-5) may receive GNSS signals from a plurality of GNSS satellites. The signals may be received through an antenna and a radio frequency (RF) processing circuits.

At block 604 the GNSS rover unit determines GNSS raw data based on the GNSS signals received in block 602. In some cases, the GNSS raw data may be position data for the GNSS rover unit when the GNSS rover unit received the GNSS signals. In other cases, the GNSS raw data may be the result of process the GNSS raw data through digital signal processing (DSP) algorithms within the GNSS rover unit.

At block 606 the GNSS rover unit stores the GNSS raw data in memory of the GNSS rover unit. This memory may be, for example, non-volatile memory that can later be accessed so that the GNSS raw data can be post-processed against correction data received from at least one reference station. As another example, this memory may be volatile memory, such as RAM, so that the GNSS raw data can be processed against correction data received in real time (or in near real time while a user is take measurements or is still on a job site). The GNSS raw data may also include time information (e.g., a timestamp) for the GNSS signals, such as a timestamp of when the signals were received or a timestamp from the signals themselves.

At block 608 first and second correction data is received from at least one reference station. For example, if the GNSS raw data is being post-process at a server system, the server system may have received the GNSS raw data from the GNSS rover unit and received the first and second correction data from the at least one reference station. The at least one reference station may be, for example, from the National Geodetic Survey (NGS) Continuously Operating Reference Stations (CORS). Other reference stations could also be used. In other examples, if the GNSS raw data is being processed on the GNSS rover unit, the correction data may be received at the GNSS rover unit from servers that provide NGS CORS data. A communications interface of the GNSS rover unit can be used to receive the correction data.

The first correction data and second correction data may include time information (e.g., a timestamp) for the correction data, such as a timestamp of when the correction data was captured or when the correction data is valid. In some cases, the first correction data's time information indicates a time period earlier than the GNSS raw data's time information and the second correction data's time information indicates a time period later than the GNSS raw data's time information. Additional correction data (e.g., fourth, fifth, sixth, seventh, etc. correction data) could also be received that has time information earlier or later than the GNSS raw data. The different pieces of correction data can be received over time and stored for later use or they can be all receive contemporaneously.

At block 610 third correction data is calculated based on the first and second correction data and the GNSS raw data. If additional pieces of correction data (e.g., fourth through seventh correction) have been received, these pieces of correction data may also be used to calculate the third correction data. In one example, a spline is used to interpolate the pieces of correction data to produce the third correction data that corresponds to a time appropriate for use in correcting the GNSS raw data. The third correction data may be calculated at a server remote to the GNSS rover unit or it may be calculated on the GNSS rover unit in real time (or near real time). Other interpolation methods could also be used.

At block 612 the third correction data and the GNSS raw data are used to determine position data for the GNSS rover unit for the location of the GNSS rover unit when the GNSS signals associated with the GNSS raw data were received. Similarly as explained above, this may be done at a remote server or on the GNSS rover unit. For example, if the GNSS raw data is initial position data, the third correction data may be an offset that should be applied to the initial position data to determine the position data. As another example, the GNSS raw data may be process in view of the third correction data to determine the position data. Other procedures could also be used.

Process 600 can be repeated as necessary to repeatedly determine the position of the GNSS rover unit. As this process is repeated, the pieces of correction data may be saved so that the data does not have to be saved each time a new measurement produces new GNSS raw data that needs to be corrected.

In another embodiment, when tracking GNSS satellite signals, there is a chance of a "false lock" where a GNSS device does not find the peak correlation point but a secondary peak which can cause many meters of errors. When a receiver-generated signal code shifts to match the received satellite signal exactly, then a large correlation peak is detected. Some mis-matched positions can also generate a correlation peak which is called a "false lock" which results in the wrong range calculation to satellite and the incorrect GNSS positions of the GNSS device. To significantly reduce possible error from a secondary peak, in this embodiment, each satellite signal is tracked with more than one channel of the GNSS device. If the position measurements between the channels for the signal do not agree (e.g., within a specified margin), the locking process is resumed on a set of the channels that do not agree (e.g., all channels or a subset of the channels, such as the one or more channels that do not agree with the other channels and one or more of the other channels). While the possibility of a "false lock" is small, it is not negligible. If the possibility of a false lock, for example, is one percent, then the possibility of two channels having the same error is 1/10,000. If more than two channels are assigned to a signal and have an error, the possibility decreases even further. In other words, by tracking a satellite signal with multiple channels, the possibility of a "false lock" can be greatly reduced. Each channel may be defined by particular (dedicated, shared, or a mix of both) hardware resources (e.g., portions of CPU 306 or other dedicated hardware), instances of threads of an algorithm, instances of processes one algorithm, instances of different algorithms, or some combination of the foregoing.

Figure 7:
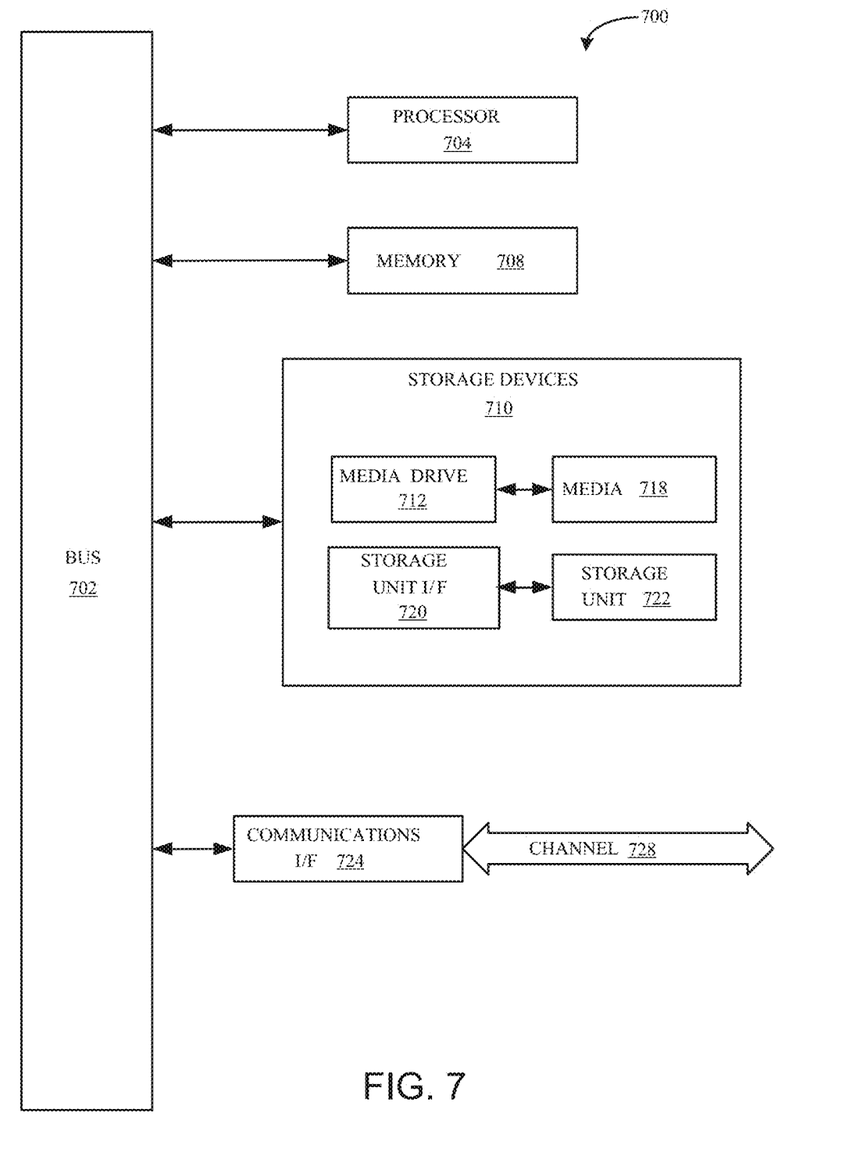
FIG. 7 depicts an exemplary computer system that may be used to implement embodiments of the present invention.

FIG. 7 illustrates an exemplary computing system 700 that may be employed to implement processing functionality for various aspects of the current technology (e.g., as a geodesic device, receiver, CPU 360, activity data logic/database, combinations thereof, and the like). Those skilled in the relevant art will also recognize how to implement the current technology using other computer systems or architectures. Computing system 700 may represent, for example, a user device such as a desktop, mobile phone, geodesic device, and so on as may be desirable or appropriate for a given application or environment. Computing system 700 can include one or more processors, such as a processor 704.

Processor 704 can be implemented using a general or special purpose processing engine such as, for example, a microprocessor, microcontroller or other control logic. In this example, processor 704 is connected to a bus 702 or other communication medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory ("ROM") or other static storage device coupled to bus 702 for storing static information and instructions for processor 704.

The computing system 700 may also include information storage mechanism 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 718 may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In alternative embodiments, information storage mechanism 710 may include other similar instrumentalities for allowing computer programs or other instructions or data to be loaded into computing system 700. Such instrumentalities may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a USB port), a PCMCIA slot and card, etc. Software and data transferred via communications interface 724 are in the form of signals which can be electronic, electromagnetic, optical, or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable storage medium" may be used generally to refer to media such as, for example, memory 708, storage device 718, or storage unit 722. These and other forms of computer-readable media may be involved in providing one or more sequences of one or more instructions to processor 704 for execution. Such instructions, generally referred to as "computer program code" (which may be grouped in the form of computer programs or other groupings), when executed, enable the computing system 700 to perform features or functions of embodiments of the current technology.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of the technology as described herein.

It will be appreciated that, for clarity purposes, the above description has described examples with reference to different functional units and processors. However, it will be apparent that any suitable distribution of functionality between different functional units, processors, or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

What is claimed is:

1. A method of determining a position of a GNSS device, the method comprising:
   receiving GNSS signals at the GNSS device from a plurality of GNSS satellites;
   generating, at the GNSS device, GNSS raw data based on the GNSS signals;
   storing the GNSS raw data on the GNSS device;
   receiving first correction data and second correction data,
      wherein the first correction data corresponds to a first time,
      wherein the second correction data corresponds to a second time later than the first time, and
      wherein the first correction data and the second correction data are generated from data from at least one reference station;
   interpolating the first correction data and the second correction data to produce third correction data, wherein the third correction data corresponds to a time of the GNSS signals;
   determining position data for the GNSS device based on the third correction data and the GNSS raw data.

2. The method of claim 1 comprising:
   receiving fourth correction data, fifth correction data, sixth correction data, and seventh correction data, wherein the fourth correction data, the fifth correction data, sixth correction data, and seventh correction data are data generated from data provided by at least one reference station; and
   wherein determining the third correction data is further based on the fourth correction data, fifth correction data, sixth correction data, and seventh correction data.

3. The method of claim 1, wherein the at least one reference station is at least one CORS station.

4. The method of claim 1, wherein determining position data for the GNSS device occurs on a computer external to the GNSS device.

5. The method of claim 1 further comprising:
   transmitting the GNSS raw data from the GNSS device to a computer external to the GNSS device.

6. The method of claim 5 further comprising:
   receiving a correction offset, wherein determining position data for the GNSS device is further based on the correction offset.

7. The method of claim 1 further comprising:
   receiving the position data for the GNSS device at the GNSS device from a remote computer.

8. The method of claim 1, wherein determining third correction data includes using a spline to interpolate the first correction data and the second correction data.

9. One or more non-transitory computer-readable storage mediums encoded with processor executable instructions for determining a position of a GNSS device, the processor executable instructions comprising instructions for:
   receiving GNSS signals at the GNSS device from a plurality of GNSS satellites;
   generating, at the GNSS device, GNSS raw data based on the GNSS signals;
   storing the GNSS raw data on the GNSS device;
   receiving first correction data and second correction data,
      wherein the first correction data corresponds to a first time,
      wherein the second correction data corresponds to a second time later than the first time, and
      wherein the first correction data and the second correction data are generated from data from at least one reference station;
   interpolating the first correction data and the second correction data to produce third correction data, wherein the third correction data corresponds to a time of the GNSS signals; and
   determining position data for the GNSS device based on the third correction data and the GNSS raw data.

10. The one or more non-transitory computer-readable storage mediums of claim 9, the processor executable instructions comprising instructions for:
    determining position data for the GNSS device based on the third correction data and the GNSS raw data.

11. The one or more non-transitory computer-readable storage mediums of claim 9, the processor executable instructions comprising instructions for:
    receiving fourth correction data, fifth correction data, sixth correction data, and seventh correction data, wherein the fourth correction data, the fifth correction data, sixth correction data, and seventh correction data are data generated from data provided by at least one reference station; and
    wherein determining the third correction data is further based on the fourth correction data, fifth correction data, sixth correction data, and seventh correction data.

12. The one or more non-transitory computer-readable storage mediums of claim 9, wherein the at least one reference station is at least one CORS station.

13. The one or more non-transitory computer-readable storage mediums of claim 9, wherein determining position data for the GNSS device occurs on a computer external to the GNSS device.

14. The one or more non-transitory computer-readable storage mediums of claim 9, the processor executable instructions comprising instructions for:
transmitting the GNSS raw data from the GNSS device to a computer external to the GNSS device.

15. The one or more non-transitory computer-readable storage mediums of claim 14, the processor executable instructions comprising instructions for:
receiving a correction offset, wherein determining position data for the GNSS device is further based on the correction offset.

16. The one or more non-transitory computer-readable storage mediums of claim 9, the processor executable instructions comprising instructions for:
receiving the position data for the GNSS device at the GNSS device from a remote computer.

17. A GNSS device comprising:
an RF input configured to receive GNSS satellite signals from GNSS satellites;
a processor configured to process the GNSS satellite signals; and
memory encoded with instructions executable by the processor, the instructions for:
generating GNSS signals at the GNSS device from a plurality of GNSS satellites;
determining, at the GNSS device, GNSS raw data based on the GNSS signals;
storing the GNSS raw data on the GNSS device;
receiving first correction data and second correction data,
wherein the first correction data corresponds to a first time,
wherein the second correction data corresponds to a second time later than the first time, and
wherein the first correction data and the second correction data are generated from data from at least one reference station;
interpolating the first correction data and the second correction data to produce third correction data, wherein the third correction data corresponds to a time of the GNSS signals;
determining position data for the GNSS device based on the third correction data and the GNSS raw data.

* * * * *